United States Patent [19]

Shiga et al.

[11] 4,123,387
[45] Oct. 31, 1978

[54] CATALYSTS FOR POLYMERIZATION OF OLEFINS

[75] Inventors: Akinobu Shiga; Yoshiharu Fukui; Kazuhiro Matsumura; Toshio Sasaki; Masahisa Ohkawa, all of Niihama, Japan

[73] Assignee: Sumitomo Chemical Company, Limited, Osaka, Japan

[21] Appl. No.: 777,269

[22] Filed: Mar. 14, 1977

[30] Foreign Application Priority Data

Mar. 15, 1976 [JP] Japan ................................. 51-28313

[51] Int. Cl.$^2$ ............................................... C08F 4/64
[52] U.S. Cl. .............................. 252/429 B; 526/137; 526/142
[58] Field of Search ...................... 252/429 B, 429 C

[56] References Cited

U.S. PATENT DOCUMENTS

| 3,131,171 | 4/1964 | Calfee | 252/429 B X |
| 3,354,139 | 11/1967 | Vandenberg | 252/429 B X |
| 3,530,107 | 9/1970 | Yoshidra et al. | 252/429 B X |
| 3,701,763 | 10/1972 | Wada et al. | 252/429 B X |
| 3,769,233 | 10/1973 | Hermans et al. | 252/429 B X |
| 3,984,350 | 10/1976 | Karayannis et al. | 252/429 B |

Primary Examiner—Patrick Garvin
Attorney, Agent, or Firm—Sughrue, Rothwell, Mion, Zinn and Macpeak

[57] ABSTRACT

A solid catalyst for olefin polymerization which is obtained by the catalytic treatment of a titanium trichloride composition with a mixture of a halogenated hydrocarbon and an ether, the composition being produced by subjecting a solid reduction product, which is obtained by reduction of titanium tetrachloride with an organo-aluminum compound, to heat treatment or to catalytic treatment with a specific organo-aluminum compound, aluminum halide, an ether and the like. In the polymerization of an olefin, combined catalyst systems of this solid catalyst and organo-aluminum compounds as activators can be used for efficient production of olefin polymers having a high crystallinity.

22 Claims, No Drawings

CATALYSTS FOR POLYMERIZATION OF OLEFINS

BACKGROUND OF THE INVENTION

1. Field of the Invention

The present invention relates to a method for the production of olefin polymers having a high crystallinity.

2. Description of the Prior Art

It is well known that olefins can be polymerized by the so-called Ziegler-Natta catalyst comprising a compound of a transition metal in Groups IV to VI of the periodic table and a metal in Groups I to III in the periodic table or an organo-compound thereof. Most generally, the polymerization is carried out at less than about 100° C., and the polymers are obtained in a slurry form.

In this polymerization process, amorphous polymers are produced as a by-product in addition to olefin polymers of high stereo-regularity which are very valuable industrially.

This amorphous polymer has a low industrial value and adversely effects the mechanical properties of products formed therefrom, for example, film, fiber and the like, of the olefin polymers.

Further, the formation of this amorphous polymer uselessly consumes the monomer raw material, and equipment for removal of the polymer become necessary. This is a very important disadvantage from an industrial point of view.

Consequently, it can easily be imagined that, if the formation of such polymer is substantially or completely inhibited, such would be very advantageous industrially.

In the polymerization process, on the other hand, the catalyst remains as a residue in the olefin polymers and adversely effects the stability and processability of the polymers. Accordingly, equipment for removal of the residual catalyst and stabilization of the polymers become necessary.

These disadvantages of the process can be improved by increasing the catalytic activity which is expressed by the yield of olefin polymer per unit weight of catalyst. Further, equipment for removal of the residual catalyst becomes unnecessary and thus a reduction in the manufacturing cost of the olefin polymer becomes also possible.

In the production of olefin polymers such as propylene polymers, butene-1 polymers and the like, titanium trichloride is most widely used as the transition metal compound which is a component of the solid catalyst.

Titanium trichloride used for such purpose is obtained by (1) reducing titanium tetrachloride with hydrogen, followed by activation by ball-mill powdering, (2) reducing titanium tetrachloride with metallic aluminum, followed by activation by ball-mill powdering (in this case, the resulting compound has the general formula $TiCl_3(AlCl_3)_{1/3}$), or (3) reducing titanium tetrachloride with an organo-aluminum compound at $-30°$ to 30° C. and heating the resulting solid reduction product at 100° to 180° C. to change the crystal form thereof.

Since, however, the titanium trichloride thus obtained is not sufficiently satisfactory in terms of catalytic activity and in terms of the stereo-regularity of the polymers produced, Japanese patent publication No. 92,298/1973 discloses an improvement in the titanium trichloride composition obtained by the reduction of titanium tetrachloride with an organo-aluminum compound, followed by heat treatment. That is, this improvement comprises powdering the above-described titanium trichloride composition and other compounds in a ball mill, followed by extraction-washing with a solvent. In this improved process, however, it is essential to pulverize the titanium trichloride composition in a ball mill. But the catalyst obtained by this process has insufficient catalytic activity.

An improvement in the catalytic activity of the titanium trichloride composition is also disclosed in Japanese patent publication No. 123,091/1975. This patent discloses an improvement in the solid complex catalyst disclosed in Japanese patent publication No. 34,478/1972. The former patent comprises treating the solid complex catalyst (titanium trichloride composition) with carbon tetrachloride.

In investigations leading to this invention, it was found, however, that the effect of the carbon tetrachloride treatment is not sufficient as will be shown later in the reference examples herein.

Further, Japanese patent publication No. 143,790/1975 discloses treatment of the solid resulting from the reduction of titanium tetrachloride with aluminum powder or an organo-aluminum compound with a mixture of a complexing agent and carbon tetrachloride. The disclosure is that after drop-wise adding an organo-aluminum compound to titanium tetrachloride at a temperature of $-10°$ to 10° C., the reaction may be completed by increasing the temperature of the reaction mixture to 20° to 100° C., but preferably the reaction is completed by maintaining a low temperature without increasing the temperature. Since, however, the solid catalyst thus obtained is very unsatisfactory in terms of catalytic activity and with respect to the stereo-regularity of the polymers formed, it is desirable to repeat the carbon tetrachloride treatment once more.

SUMMARY OF THE INVENTION

Extensive studies on the treatment of various kinds of titanium trichloride compositions with a mixture of a halogenated hydrocarbon and an ether have now been made. As a result, it has been found that the solid catalysts obtained by reducing titanium tetrachloride with an organo-aluminum compound, heat-treating the resulting solid reduction product at higher than about 100° C. and then treating the product with a mixture of a halogenated hydrocarbon and an ether, have greatly improved catalytic activity and the polymers produced therewith have greatly improved stereo-regularity as compared with those disclosed in Japanese patent publication No. 143,790/1975 above, that is, those resulting from the treatment of the solid reduction product with a mixture of carbon tetrachloride and a complexing agent or those resulting from further treatment with carbon tetrachloride. The present invention is based on this finding.

Further, it was found in comparison with the foregoing catalysts that the solid catalysts resulting from the methods described below have quite superior catalytic activity and the polymers produced therefrom have quite superior stereo-regularity. For the production of the solid catalysts, a titanium trichloride composition is first produced by (1) treating the above-described solid reduction product with an organo-aluminum compound or (2) by treating the solid reduction product with an ether, followed by treatment with an organo-aluminum compound, aluminum chloride or titanium tetrachloride. Next, the resulting composition is treated with a mixture of a halogenated hydrocarbon and an ether to obtain the objective solid catalyst. The present invention is also based on this finding.

An object of the present invention is to provide a solid catalyst for olefin polymerization which produces olefin polymers having a high crystallinity.

Another object of the present invention is to provide a method for the production of olefin polymers having a high crystallinity.

These and other objects and advantages of the present invention will become apparent from the following description of the invention.

The present invention provides in one embodiment, a method for the production of (A) a solid titanium trichloride catalyst which comprises catalytically treating the titanium trichloride composition produced by the following method with a mixture of a halogenated hydrocarbon and an ether, and, in a second embodiment, a method for the production of olefin polymers having a high crystallinity which comprises polymerizing olefins using a catalyst system comprising (A) the solid catalyst and (B) an organo-aluminum compound of the formula:

$$R'_l AlY_{3-l}$$

wherein R' is a straight or branched alkyl group, an alicyclic group or an aromatic hydrocarbon group, each having up to 18 carbon atoms, Y is a halogen atom or a hydrogen atom or an alkoxy group, and $l$ satisfies the relationship $1.5 \leq l \leq 3$, as an activator.

The titanium trichloride composition used herein is obtained from the solid reduction product produced by the following methods, the solid reduction product being produced by the reduction of titanium tetrachloride with an organo-aluminum compound of the formula:

$$R_n AlX_{3-n}$$

wherein R is a straight or branched alkyl group, an alicyclic group or an aromatic hydrocarbon group, each having up to 18 carbon atoms, X is a halogen atom or a hydrogen atom, and $n$ satisfies the relationship $1 \leq n \leq 3$.

(a) The solid reduction product is heat-treated at 100° to 180° C. in the absence of or in the presence of an inert solvent.

(b) The solid reduction product is catalytically treated with an aluminum compound of the formula:

$$R''_p AlX_{3-p}$$

wherein R'' is a straight or branched alkyl group, an alicyclic group or an aromatic hydrocarbon group, each having up to 18 carbon atoms, X is a halogen atom, and $p$ satisfies the relationship $1 \leq p \leq 1.5$, or the thus treated product is further catalytically treated with an ether.

(c) The solid reduction product is catalytically treated with an ether and then with an aluminum compound as defined in (b) above, or the thus treated product is further catalytically treated with an ether.

(d) The solid reduction product is catalytically treated with an ether and then with an aluminum compound as defined above, in the presence of an organo-halogen compound of the formula:

$$R'''X$$

wherein R''' is a straight or branched alkyl group, an alicyclic group or an aromatic hydrocarbon group, each having up to 18 carbon atoms, and X is a halogen atom, or the thus treated product is further catalytically treated with an ether.

(e) The solid reduction product is catalytically treated with an ether and then with an aluminum halide of the formula:

$$AlX_3$$

wherein X is a halogen atom, which is dissolved in an aromatic hydrocarbon in the presence of a hydrogen halide of the formula:

$$HX$$

wherein X is a halogen atom, or the thus treated product is further treated with an ether.

(f) The solid reduction product is catalytically treated with an ether and then with titanium tetrachloride.

DETAILED DESCRIPTION OF THE INVENTION

Of the titanium trichloride compositions resulting from these methods, those which are obtained by methods (b), (c), (d), (e) and (f) are preferred.

Examples of organo-aluminum compounds of the formula:

$$R_n AlX_{3-n}$$

wherein R is a straight or branched alkyl group, an alicyclic group or an aromatic hydrocarbon group, each having up to 18 carbon atoms, X is a halogen atom or a hydrogen atom, and $n$ satisfies the relationship $1 \leq n \leq 3$, which can be used to produce the solid reduction product include: methylaluminum dichloride, ethylaluminum dichloride, n-propylaluminum dichloride, methylaluminum sesquichloride, ethylaluminum sesquichloride, dimethylaluminum chloride, diethylaluminum chloride, di-n-propylaluminum chloride, trimethylaluminum, triethylaluminum, triisobutylaluminum, ethyl dicyclohexyl aluminum, triphenylaluminum, diethylaluminum hydride, diisobutylaluminum hydride, diethylaluminum bromide, diethylaluminum iodide. Of these compounds, diethylaluminum chloride and ethylaluminum sesquichloride produce particularly preferred results.

The reduction of the titanium tetrachloride is carried out at about −100° to about 60° C., preferably −30° to 30° C. This reduction is preferably carried out in an inert hydrocarbon solvent (e.g., pentane, hexane, heptane, octane, decane, etc.).

In the production of titanium trichloride compositions according to method (a), the solid reduction product resulting from the reduction of titanium tetrachloride with an organo-aluminum compound is heat-treated. The object of this heat treatment is to change the crystal form of the solid reduction product.

When the solid reduction product is treated, without a previous heat-treatment, with a mixture of a halogenated hydrocarbon and an ether, only a small improvement in catalytic activity and the stereo-regularity of the polymers formed can be expected as is shown in the reference examples herein. Contrary to this, when the crystal form of the solid reduction product is previously changed by this treatment, the catalytic activity and the stereo-regularity of the polymers produced are remarkably improved by the treatment with a mixture of a halogenated hydrocarbon and an ether.

The above-described heat-treatment may be carried out in the absence of or in the presence of an inert hydrocarbon solvent. Specific examples of suitable inert hydrocarbon solvents which can be used are hexane, heptane, octane, decane and the like. Further, the heat-treatment can be carried out without isolation of the solid reduction product from the reaction mixture obtained in the reduction. The preferred heat-treatment temperature is higher than about 100° to about 180° C. The heat-treatment time is not particularly limited, but is preferably about 0.5 to about 5 hours, in general.

In the production of titanium trichloride compositions according to methods (b), (c), (d), (e) or (f), the catalytic treatment with an ether is carried out once or twice.

Preferred ethers which can be used herein are compounds of the formula:

$$R_1-O-R_2$$

wherein $R_1$ and $R_2$, which may be the same or different, each is a straight or branched alkyl group, an alicyclic group or an aromatic hydrocarbon group, each having up to 10 carbon atoms.

Where the catalytic treatment with the ether is conducted twice, the ether used in the first treatment may be the same as or different from that used in the second treatment.

Specifically, the following ether compounds are examples of ethers which can be used: diethyl ether, di-n-propyl ether, diisopropyl ether, di-n-butyl ether, diisoamyl ether, dineopentyl ether, di-n-hexyl ether, di-n-octyl ether, diphenyl ether, di-o-tolyl ether, di-p-tolyl ether, dicyclohexyl ether and the like. Preferred compounds of these compounds are those in which $R_1$ and $R_2$ are both an alkyl group. Particularly preferred ethers are di-n-butyl ether and diisoamyl ether.

The treatment of the solid reduction product with the ether is advantageously carried out in the presence of a diluent. Preferred diluents are inert hydrocarbon compounds such as hexane, heptane, octane, decane, decalin, benzene, toluene and xylene, etc.

The amount of the ether used is about 0.05 to about 3 times on a molar basis, preferably 0.5 to 1.5 times on a molar basis, the amount of the titanium trichloride contained in the solid product to be treated with the ether. Preferred treating temperatures range from about 0° to about 100° C. The treating time is not particularly limited, but it is preferably ⅓ to 5 hours.

In the production of titanium trichloride compositions according to methods (b), (c) or (d), the solid reduction product or ether-treated solid product thereof is catalytically treated with an aluminum compound of the formula:

$$R''_p AlX_{3-p}$$

wherein $R''$ is a straight or branched alkyl group, an alicyclic group or an aromatic hydrocarbon group, each having up to 18 carbon atoms, X is a halogen atom, and $p$ satisfies the relationship $1 \leq p \leq 1.5$. Alkylaluminum dihalides are preferred as such a compound, and of these, alkylaluminum dichlorides produce particularly preferred results.

Specifically, examples of such compounds include the following: methylaluminum dichloride, ethylaluminum dichloride, n-propylaluminum dichloride, n-butylaluminum dichloride, n-octylaluminum dichloride, phenylaluminum dichloride, o-tolylaluminum dichloride, cyclohexylaluminum dichloride, methylaluminum dibromide, ethylaluminum dibromide, phenylaluminum dibromide, methylaluminum diiodide and the like. These aluminum compounds may be used individually or as a mixture of two or more compounds. Of these, ethylaluminum dichloride produces particularly preferred results.

The amount of the aluminum compound used is not particularly limited, but it is preferably about 0.1 to about 10 times on a molar basis, particularly preferably 0.5 to 5 times on a molar basis, the amount of titanium trichloride contained in the solid product.

The above-described treatment may be carried out in the absence of or presence of a diluent. Preferred diluents are inert hydrocarbon compounds such as hexane, heptane, octane, decane, decalin, benzene, toluene, xylene and the like.

The treating temperature is not particularly limited, but it generally ranges from about room temperature (e.g., 20°–30° C.) to about 200° C. and preferably 50° to 180° C. The treating time is also not particularly limited, but it is preferably 0.5 to 5 hours, in general.

In the production of titanium trichloride compositions according to method (d), organo-halogen compounds of the formula:

$$R'''X$$

wherein $R'''$ is a straight or branched alkyl group, an alicyclic group or an aromatic hydrocarbon group, each having up to 18 carbon atoms, and X is a halogen atom, are used. Of these compounds, those in which $R'''$ is an alkyl group or an aralkyl group produce preferred results.

Specifically, suitable examples of organo-halogen compounds which can be used include: methyl chloride, ethyl chloride, methyl bromide, ethyl bromide, n-propyl chloride, n-butyl chloride, n-butyl bromide, tert-butyl chloride, sec-butyl chloride, chlorocyclohexane, chlorobenzene, bromobenzene, benzyl chloride, benzyl bromide and the like. The amount of the organo-halogen compound used is not particularly limited, but generally ranges from about 0.01 to about 1 mol, preferably 0.05 to 0.5 mol, per mol of the aluminum compound of the formula:

$$R''_p AlX_{3-p}$$

In the production of titanium trichloride compositions according to method (e), an aluminum halide is used for the catalytic treatment, in which the aluminum halide is dissolved in an aromatic hydrocarbon in the presence of a hydrogen halide of the formula, HX, wherein X is a halogen atom. Specific examples of aluminum halides which can be used include: aluminum chloride, aluminum bromide and aluminum iodide.

Specific examples of aromatic hydrocarbons are benzene, toluene, xylene, ethylbenzene, 1,3,5-trimethylbenzene, monochlorobenzene and mixtures thereof, but the aromatic hydrocarbon is not, however, to be construed as being limited to these compounds.

To dissolve the aluminum halide in the aromatic hydrocarbon, the presence of the hydrogen halide of the formula, HX (wherein X is a halogen atom), such as hydrogen chloride, hydrogen bromide or hydrogen iodide, is essential. This dissolution can be carried out at from about room temperature to about 200° C.

The concentration of the aluminum halide can range from about 1 to about 80% by weight, in general, for the reason that amounts less than about 1% by weight do not provide sufficient effects while amounts more than about 80% by weight lead only to useless consumption which is disadvantageous industrially. Further, the amount of the aluminum halide used is not particularly limited, but it is preferably about 0.1 to about 10 times on a molar basis, particularly preferably 0.5 to 5 times on a molar basis, based on the amount of titanium trichloride contained in the ether-treated solid product.

The treating temperature may be optionally varied in the range of about $-100°$ to about 200° C. The treating time is not particularly limited, but it is preferably about 5 minutes to about 5 hours, in general.

The products resulting from the catalytic treatment of the solid reduction product with aluminum compounds, and those resulting from the catalytic treatment of the ether-treated solids with aluminum compounds, or with aluminum compounds in the presence of organo-halogen compounds, or with aluminum halides, are further treated with an ether. This ether may optionally be selected from those used for the ether-treatment of the solid reduction product. The ether used for the both ether-treatments may be the same of different. Of them, n-butyl ether and diisoamyl ether are preferred.

This ether-treatment is preferably carried out in the presence of a diluent. Preferred diluents are inert hydrocarbon compounds such as hexane, heptane, octane, decane, decalin, benzene, toluene, xylene and the like.

The amount of the ether used is about 0.05 to about 3.0 times on a molar basis, preferably 0.5 to 1.5 times on a molar basis, based on the amount of titanium trichloride contained in the solid product obtained by the treatments as described above. Preferred treating temperatures are from about 0° to about 100° C. The treating time is not particularly limited, but it is preferably from about 20 minutes to about 5 hours, in general.

In the production of titanium trichloride compositions according to method (f), the treatment with titanium tetrachloride is preferably carried out in the presence of a diluent. Suitable diluents include hexane, heptane, benzene, toluene and xylene, etc.

Preferred concentrations of titanium tetrachloride are generally within the range of about 10% by volume to about 70% by volume and the treating temperature can range from about room temperature to about 100° C., preferably 50° to 80° C. The treating time can range, preferably between about 30 minutes and about 4 hours.

The thus obtained titanium trichloride composition is catalytically treated with a mixture of a halogenated hydrocarbon and an ether. Halogenated hydrocarbons which can be used are represented by the formula:

$$CH_qX_{4-q}$$

wherein X is a halogen atom and $q$ is an integer satisfying the relationship $0 \leq q < 4$. Specifically, carbon tetrachloride, chloroform, methylene chloride, carbon tetrabromide, bromoform, methylene bromide and mixtures thereof are exemplified. Of them, carbon tetrachloride is most preferred.

The above-described treatment may be carried out in the absence of or presence of a hydrocarbon solvent (e.g., hexane, heptane, octane, decane, benzene, toluene, xylene, etc,) as a diluent. This catalytic treatment may also be carried out using a ball mill.

The amount of the halogenated hydrocarbon used depends upon the properties of the titanium trichloride compositions and the conditions of the catalytic treatment. The amount is generally, however, about 0.001 to about 1.0 times on a molar basis, preferably 0.003 to 1.0 times on a molar basis, based on the amount of titanium trichloride contained in the titanium trichloride composition.

When the molar amount is less than about 0.001 times, the effect of the catalytic treatment is not sufficient. The treatment can effectively be achieved with a molar amount of less than about 1.0 times. When the molar amounts is more than about 1.0 times, the titanium trichloride composition uselessly reacts with the halogenated hydrocarbon, which leads to a reduction in the yield of solid titanium trichloride catalyst.

Further, in the catalytic treatment of the titanium trichloride composition, the presence of an ether is essential. This is clearly shown from the results of Reference Examples 2, 9, 18 and 19 given hereinafter wherein the titanium chloride composition is catalytically treated with carbon tetrachloride alone. In these reference examples, improvement of catalytic activity is not observed. In this catalytic treatment, some titanium trichloride compositions have a property in which the composition particles stick to one another during the treatment to form a viscous mass.

In the catalytic treatment of the titanium trichloride composition with a mixture of a halogenated hydrocarbon and an ether, the ether used may optionally be selected from those used in methods (b), (c), (d), (e) and (f). This ether can be represented by the formula:

$$R_3{-}O{-}R_4$$

wherein $R_3$ and $R_4$, which may be the same or different, each is an alkyl group, an alicyclic group or an aromatic hydrocarbon group, each having up to 10 carbon atoms. Specific examples of suitable ethers which can be used are those described hereinbefore. Preferred compounds are those in which $R_3$ and $R_4$ each is an alkyl group, and of them di-n-butyl ether and diisoamyl ether produce particularly preferred results.

The amount of the ether used depends upon the properties of the titanium trichloride compositions and the treatment conditions. The amount is, in general, however, about 0.001 to about 5.0 times on a molar basis, preferably 0.003 to 1.5 times on a molar basis, based on the amount of the titanium trichloride contained in the titanium trichloride composition.

The catalytic treatment of titanium trichloride compositions with a mixture of a halogenated hydrocarbon and an ether is carried out at about 0° to about 150° C., preferably 40° to 100° C. Suitable preferred treating times range between about 5 minutes and about 5 hours.

The term "catalytic treatment" referred to herein means the operations of bringing solid titanium trichloride into contact with a treating agent, and separating the resulting solid by washing and filtration. Suitable washing media which can be used include inert hydrocarbon solvents, for example, those used as a diluent in the description above.

The treating times and treating temperatures referred to herein mean the times and temperatures which are required to bring both into contact with each other, respectively.

In the olefin polymerization of the present invention, the solid catalyst is used in combination with an activator. The activator is an organo-aluminum compound of the formula:

$$R'_l AlY_{3-l}$$

wherein $R'$ is a straight or branched alkyl group, an alicyclic group or an aromatic hydrocarbon group, each having up to 18 carbon atoms, Y is a halogen atom or a hydrogen atom, or an alkoxy group and $l$ satisfies the relationship $1.5 \leq l \leq 3$. Specifically, classes of such a compound are dialkylaluminum halides, dialkylaluminum alkoxides, trialkylaluminums, dialkylaluminum hydrides and the like. Of them, diethylaluminum chloride is preferred.

Polymerization conditions in the present invention are not substantially different from those generally used in conventional olefin polymerizations except that the catalyst used in the present invention is different from the conventional catalyst employed.

In the olefin polymerization, the molar ratio of solid titanium trichloride catalyst to organo-aluminum compound can be varied over a wide range of about 10:1 to about 1:500, but a range between 2:1 and 1:200 is preferably used.

The polymerization may be carried out at a temperature ranging from about $-30°$ to about $200°$ C. The rate of polymerization is reduced when the temperature is less than about $0°$ C., while polymers having a high degree of stereo-regularity cannot be obtained when the temperature is higher than about $100°$ C. Consequently, the polymerization is preferably conducted at a temperature of $0°$ to $100°$ C.

The polymerization pressure is not particularly limited, but a pressure between about 3 and about 100 atm. is preferred from industrial and economical points of view.

The polymerization may be carried out continuously or batchwise, as desired.

Olefins which can be used in the present invention are those having 2 to 10 carbon atoms, and specific examples include ethylene, propylene, butene-1, pentene-1, hexene-1, 3-methylpentene-1, 4-methylpentene-1 and the like. The olefins which can be used in the present invention are not, however, to be construed as being limited to these specific examples.

The polymerization of the present invention can include a homopolymerization and a copolymerization. In the copolymerization, copolymers can be obtained by copolymerizing two or more olefins together. For obtaining copolymers having a high degree of stero-regularity, in this case, it is desirable to control the blending ratio of the two olefins so that one of them is present in an amount less than about 10% by mol of the other.

The polymerization of the present invention may easily be carried out utilizing the heteroblock copolymerization process which is carried out in two or more steps.

The polymerization may be carried out using a slurry polymerization employing an inert hydrocarbon solvent (e.g., butane, pentane, hexane, heptane, octane, etc.), or without a solvent. Further, the polymerization may be carried out in the vapor phase of the olefins.

The present invention is illustrated in greater detail by reference to the following examples, but the present invention is not to be construed as being limited to these examples. Unless otherwise indicated herein, all parts, percents, ratios and the like are by weight.

EXAMPLE 1

Catalyst Preparation 1 (Preparation of a solid reduction product)

The atmosphere of a 1-liter reaction vessel was replaced with argon. 200 cc of dry hexane and 50 cc of titanium tetrachloride were charged into the vessel and the mixture was kept at $-5°$ C. Thereafter, a solution comprising 150 cc of dry hexane and 58 cc of diethylaluminum chloride was added drop-wise while maintaining the temperature of the reaction system of less than $-3°$ C. After the addition was completed, stirring of the reaction system was continued for an additional 30 minutes, and then the reaction system was heated to $70°$ C. and kept at this temperature for 1 hour with stirring.

The solid reduction product was separated from the solution by allowing the solution to stand and was washed with three 200 cc portions of hexane. Thus, 74.0 g of the solid reduction product was obtained.

The aluminum content of this titanium trichloride was 4.60% by weight.

Catalyst Preparation 2 [Preparation of Titanium Trichloride Composition (A)]

The solid reduction product prepared as in Catalyst Preparation 1 was slurried in n-decane and the slurry concentration was adjusted to 0.2 g/cc. This slurry was heat-treated at $140°$ C. for 2 hours. After reaction, the supernatant liquor was removed. The residual solid was washed with two 200 cc portions of hexane to obtain a titanium trichloride composition.

The titanium trichloride composition thus obtained was designated Titanium Trichloride Composition (A).

Catalyst Preparation 3 [Treatment of Titanium Trichloride Composition (A)]

10.5 g of Titanium Trichloride Composition (A) prepared in Catalyst Preparation 2 was slurried in 52.0 cc of hexane. Carbon tetrachloride and diisoamyl ether were added to the slurry to achieve the following molar ratio: $TiCl_3$ contained in the composition (referred to simply as "$TiCl_3$ composition" or "composition" hereinafter) (A): $CCl_4$: diisoamyl ether = 1:0.5:0.5. The mixture was reacted at $60°$ C. for 2 hours. After reaction, the supernatant liquor was removed. The residual solid was washed with three 50 cc portions of heptane and dried to obtain a solid titanium trichloride catalyst.

Polymerization of Propylene

Polymerization Process 1

The atmosphere of a 5-liter stainless steel autoclave equipped with a stirrer was replaced with nitrogen. 1.5 liter of dry heptane, 3.0 g of diethylaluminum chloride and 330 mg of the above-described solid titanium trichloride catalyst were charged in the autoclave, and hydrogen gas was further charged therein to a partial pressure of 0.16 kg/cm².

The temperature of the autoclave was increased to $60°$ C. and propylene was charged under pressure to 6 kg/cm² (gauge). Polymerization was started and continued at this temperature for 4 hours while maintaining the pressure by supplying propylene thereto.

After the polymerization was completed, introduction of the monomer was stopped, and the unreacted monomer was purged. The catalyst was decomposed by the addition of 100 cc of butanol.

The resulting polymer was filtered on a Buchner funnel, washed with three 500 cc portions of heptane and dried at 60° C. under reduced pressure. Thus, 341 g of polypropylene was obtained. The filtrate was steam-distilled to remove heptane. 5.5 g of an amorphous polymer was recovered as a residue.

The catalytic activity of the solid titanium trichloride catalyst was 263, when expressed in terms of the yield of polypropylene (gram-polypropylene)/gramsolid $TiCl_3$ L cataylst.hour (referred to as $R_p$, hereinafter).

The proportion of heptane (60° C.)-insoluble portion (referred to as HIP, hereinafter) in the total weight of the polymers was 98.4%. The heptane (60° C.)-insoluble portion contained a boiling heptane-insoluble portion (referred to as II, hereinafter) of 97.6%.

The value IY where IY is:

$$IY = (HIP/100) \times (II/100) \times 100$$

was 96.0.

The resulting polymer had an intrinsic viscosity (135° C., in tetralin) of 1.91. The intrinsic viscosity under this measurement condition is referred to as $[\eta]$, hereinafter.

Polymerization Process 2

The atmosphere of a 5-liter stainless steel autocalve equipped with a stirrer was replaced with nitrogen. 3.0 g of diethylaluminum chloride and 80 mg of the solid titanium trichloride catalyst were charged therein and hydrogen gas was further charged therein to a partial pressure of 0.53 kg/cm². Thereafter, 1.4 kg of liquid propylene was charged under pressure and polymerization was continued for 4 hours while maintaining the autoclave at 70° C.

After the polymerization was completed, the unreacted monomer was purged and the catalyst was decomposed by the addition of 100 cc of butanol. The resulting polypropylene was filtered on a Buchner funnel and dried at 60° C. under reduced pressure to obtain 496 g of polypropylene. Catalytic activity of the solid titanium trichloride catalyst: $R_p$ = 1,550. IY = 96.2.

REFERENCE EXAMPLE 1

Polymerization of propylene was carried out according to Polymerization Process 1 of Example 1, using Titanium Trichloride Composition (A) prepared in Catalyst Preparation 2 of Example 1. Catalytic acitivity of the catalyst: $R_p$ = 130. IY = 93.0.

REFERENCE EXAMPLE 2

Titanium Trichloride Composition (A) was treated in the same manner as in Catalyst Preparation 3 of Example 1, except that diisoamyl ether was not used. The particles of the Titanium Trichloride Composition (A) stuck to one another in a viscous mass and could not be treated as a slurry. Further, it was impossible, unlike Example 1, to separate the catalyst into pieces after washing and drying.

REFERENCE EXAMPLE 3

The titanium trichloride catalyst in Reference Example 2 was mixed with 50 cc of dry toluene and diisoamyl ether in an amount of 0.5 mol/mol of the catalyst. The mixture was stirred at 60° C. for 2 hours. After reaction, the catalyst was washed with two 30 cc portions of toluene and 30 cc of hexane and vacuum-dried. The catalyst could be separated into pieces and used for polymerization. As is clear from this result, it became possible to treat this catalyst as a slurry by this ether treatment.

Propylene was polymerized according to Polymerization Process 1 of Example 1 using this catalyst. The catalytic activity was very low: $R_p$ = 60. IY = 91.1.

REFERENCE EXAMPLE 4

The solid reduction product prepared as in Catalyst Preparation 1 of Example 1 was charged, without a previous heat-treatment, in hexane so as to produce a slurry content of 0.2 g/cc. Thereafter, carbon tetrachloride and diisoamyl ether were further added to the slurry so as to achieve the following molar ratio: $TiCl_3$ contained in the solid reduction product:$CCl_4$:diisoamyl ether = 1:0.5:0.5. The mixture was reacted at 60° C. for 2 hours. After the reaction, the supernatant liquor was removed and the residual solid was washed and vacuum-dried to obtain a solid catalyst.

Propylene was polymerized according to Polymerization Process 1 of Example 1 using this solid catalyst. Catalytic activity: $R_p$ = 197. IY = 90.9.

It is apparent that these values of $R_p$ and IY are very low as compared with the polymerization results in Example 1. Consequently, it is apparent from the results obtained in Example 1 and Reference Examples 1, 2, 3 and 4 that the treatment of the present invention is effective.

EXAMPLE 2

Catalyst Preparation 1 (Preparation of the solid reduction product)

The atmosphere of a 1-liter reaction vessel was replaced with argon. 200 cc of dry hexane and 50 cc of titanium tetrachloride were charged into the vessel and the mixture was kept at −5° C. Thereafter, a solution comprising 270 cc of dry hexane and 105 cc of ethylaluminum sesquichloride was drop-wise added while maintaining the temperature of the reaction system at less than −3° C. After the addition was completed, stirring of the reaction system was continued for 2 additional hours.

The solid reduction product was separated from the solution by allowing the solution to stand and washed with three 200 cc portions of hexane. Thus, 76 g of the solid reduction product was obtained.

Catalyst Preparation 2 [Preparation of Titanium Trichloride Composition (A)]

The solid reduction product prepared as in Catalyst Preparation 1 of Example 2 was slurried in n-decane and the slurry concentration was adjusted to 0.2 g/cc. This slurry was heat-treated at 120° L C. for 2 hours. After reaction, the supernatant liquor was removed. The residual solid was washed with two 200 cc portions of hexane to obtain Titanium Trichloride Composition (A).

Catalyst Preparation 3 [Treatment of Titanium Trichloride Composition (A)]

10.1 g of Titanium Trichloride Composition (A) prepared as in Catalyst Preparation 2 of Example 2 was slurried in 50 cc of hexane. Carbon tetrachloride and diisoamyl ether were added to the slurry so as to achieve the following molar ratio: $TiCl_3$ composition (A):CCl$_4$: diisoamyl ether = 1:0.5:0.5. The mixture was treated at 60° C. for 2 hours. After washing and drying, a solid titanium trichloride catalyst was obtained.

Polymerization of Propylene

Propylene was polymerized according to Polymerization Process 1 of Example 1 using the solid titanium trichloride catalyst thus obtained. Catalytic activity: $R_p$ = 310. IY = 96.4 [η] = 1.72

REFERENCE EXAMPLE 5

Propylene was polymerized according to Polymerization Process 1 of Example 1 using the Titanium Trichloride Composition (A) obtained in Catalyst Preparation 2 of Example 2. Catalytic activity: $R_p$ = 165. IY = 93.1.

REFERENCE EXAMPLE 6

The solid reduction product obtained in Catalyst Preparation 1 of Example 2 was charged, without a previous heat-treatment, into hexane so as to produce a slurry content of 0.2 g/cc. Thereafter, carbon tetrachloride and diisoamyl ether were further added to the slurry so as to achieve the following molar ratio: the solid reduction product:CCl$_4$:diisoamyl ether = 1:4:1. The mixture was treated at 30° C. for 4 hours to obtain a solid titanium trichloride catalyst.

Propylene was polymerized according to Polymerization Process 1 of Example 1 using the solid titanium trichloride catalyst thus obtained. Catalytic activity: $R_p$ = 178. IY = 90.3.

It is apparent that the values of $R_p$ and IY are very low as compared with the polymerization results in Example 2.

EXAMPLE 3

Catalyst Preparation 1

10.7 g of the solid reduction product obtained according to Catalyst Preparation 1 of Example 1 was added to a solution comprising 32.1 cc of n-decane and 21.4 cc of ethylaluminum dichloride. The mixture was treated at 115° C. for 2 hours. After reaction, the supernatant liquor was removed and the residual solid was washed with three 30 cc portions of hexane, dried and separated into pieces.

Catalyst Preparation 2

8.0 g of the titanium trichloride composition prepared according to Catalyst Preparation 1 of Example 3 was slurried in 40.0 cc of hexane. Thereafter, carbon tetrachloride and diisoamyl ether were added to the slurry so as to achieve the following molar ratio: TiCl$_3$ composition:CCl$_4$:diisoamyl ether = 1:0.5:0.5.

The mixture was treated at 60° C. for 2 hours. After washing and drying, a solid titanium trichloride catalyst was obtained.

Polymerization of Propylene

Propylene was polymerized according to Polymerization Process 1 of Example 1 using the solid titanium trichloride catalyst thus obtained. Catalytic activity: $R_p$ = 270. IY = 96.0. [η] = 1.68.

REFERENCE EXAMPLE 7

Propylene was polymerized according to Polymerization Process 1 of Example 1 using the titanium trichloride composition prepared according to Catalyst Preparation 1 of Example 3. Catalytic activity: $R_p$ = 178. IY = 95.4. [η] = 1.65.

EXAMPLE 4

Catalyst Preparation 1 (Preparation of ether-treated solid)

31.2 g of the solid reduction product prepared according to Catalyst Preparation 1 of Example 1 was suspended in 106.0 cc of dry hexane. Thereafter, diisoamyl ether in an amount of 1.2 mol/mol of TiCl$_3$ contained in the solid reduction product was added to the suspension. The mixture was stirred at 40° C. for 1 hour. After the reaction was completed, the supernatant liquor was removed and the residual solid was washed with three 100 cc portions of hexane and dried.

Catalyst Preparation 2

12.5 g of the ether-treated solid produced as in Catalyst Preparation 1 of Example 4 was added to a solution comprising 37.5 cc of n-decane and 25.0 cc of ethylaluminum dichloride. The mixture was treated at 120° C. for 2 hours. After reaction, the supernatant liquor was removed and the residual solid was washed with three 40 cc portions of hexane and dried.

The titanium trichloride composition thus obtained had an aluminum content of 4.18% by weight and showed the peak characteristic of δ-titanium trichloride in the X-ray diffraction pattern.

Catalyst Preparation 3

9.2 g of the titanium trichloride composition prepared as in Catalyst Preparation 2 of Example 4 was suspended in 46.0 cc of hexane. Thereafter, carbon tetrachloride and diisoamyl ether were added to the suspension so as to achieve the following molar ratio: composition:CCl$_4$:diisoamyl ether = 1:0.3:0.5.

The mixture was treated at 60° C. for 2 hours. The supernatant liquor was removed and the residual solid was washed with three 40 cc portions of hexane to obtain a solid titanium trichloride catalyst.

Polymerization of Propylene

Propylene was polymerized according to Polymerization Process 1 of Example 1 using the solid titanium trichloride catalyst thus obtained in Catalyst Preparation 3 of Example 4. Catalytic activity: $R_p$ = 525. IY = 97.5. [η] = 1.89. The resulting polymer had a bulk density of 0.46 g/cm$^3$.

REFERENCE EXAMPLE 8

Propylene was polymerized according to Polymerization Process 1 of Example 1 using the titanium trichloride composition in Catalyst Preparation 2 of Example 4. Catalytic activity: $R_p$ = 172 and IY = 96.5. [η] = 1.96. The resulting polymer had a bulk density of 0.43 g/cm$^3$.

REFERENCE EXAMPLE 9

The titanium trichloride composition obtained in Catalyst Preparation 2 of Example 4 was treated in the same manner as in Catalyst Preparation 3 of Example 4, except that diisoamyl ether was not used.

In this operation, the particles of the composition stuck to one another in a viscous mass, as was the case in Reference Example 2.

REFERENCE EXAMPLE 10

The titanium trichloride catalyst in Reference Example 9 was treated with diisoamyl ether in the same manner as in Reference Example 3. Using the catalyst thus obtained, propylene was polymerized according to Polymerization Process 1 of Example 1. Catalytic activity: $R_p = 95$. IY = 93.5.

EXAMPLES 5 TO 9

The titanium trichloride composition prepared according to Catalyst Preparation 2 of Example 4 was treated under the various conditions shown in Table 1 below to obtain solid titanium trichloride catalysts. Using these catalysts, propylene was polymerized according to Polymerization Process 1 of Example 1. The results obtained are shown in Table 1 below.

TABLE 1

| Example | Ether | Solvent | Halogenated Hydrocarbon (CLH) | Treatment Conditions Temperature (°C) | Time (hr) | $TiCl_3$ : CLH : ether (molar ratio) | Catalytic Activity $R_p$ | IY |
|---|---|---|---|---|---|---|---|---|
| 5 | $(n-Bu)_2O$ | Toluene | $CCl_4$ | 60 | 2.0 | 1:0.3:0.5 | 545 | 97.4 |
| 6 | " | " | " | " | " | 1:0.3:1.0 | 589 | 97.5 |
| 7 | " | Hexane | " | 70 | 1.0 | 1:0.2:0.5 | 474 | 97.5 |
| 8 | $(i-AM)_2O$ | Toluene | $CBr_4$ | 60 | 2.0 | 1:0.3:0.5 | 330 | 96.7 |
| 9 | " | " | $CHCl_3$ | 55 | " | 1:0.3:0.5 | 333 | 96.5 | n-Bu = n-butyl
i-Am = isoamyl

EXAMPLE 10

Catalyst Preparation 1

15.0 g of the titanium trichloride composition prepared according to Catalyst Preparation 2 of Example 4 was suspended in 60.0 cc of dry hexane. Thereafter, di-n-butyl ether in an equimolar amount to that of the composition was added to the suspension. The mixture was treated at 60° C. for 1 hour. After reaction, the supernatant liquor was removed and the residual solid was washed with three 50 cc portions of hexane, dried and separated into pieces. The catalyst thus obtained was designated Titanium Trichloride Composition (B).

Catalyst Preparation 2

11.5 g of Titanium Trichloride Composition (B) prepared as in Catalyst Preparation 1 of Example 10 was suspended in 57.5 cc of dry hexane. Thereafter, carbon tetrachloride and n-butyl ether were added to the suspension so as to achieve the following molar ratio: $TiCl_3$ Composition (B):$CCl_4$:$(n-Bu)_2O$ = 1:0.1:0.3. The mixture was treated at 60° C. for 2 hours. After reaction, the supernatant liquor was removed and the residual solid was washed with three 30 cc portions of hexane and dried to obtain a solid titanium trichloride catalyst.

Polymerization of Propylene

Propylene was polymerized according to Polymerization Process 1 of Example 1 using the solid titanium trichloride catalyst thus obtained. Catalytic activity: $R_p = 550$ and IY = 97.2. $[\eta] = 1.93$. The resulting polymer had a bulk density of 0.45 g/cm³.

REFERENCE EXAMPLE 11

Propylene was polymerized according to Polymerization Process 1 of Example 1 using Titanium Trichloride Composition (B) prepared as in Catalyst Preparation 1 of Example 10. Catalytic activity: $R_p = 377$. IY = 96.3. $[\eta] = 1.80$. The resulting polymer had a bulk density of 0.45 g/cm³.

REFERENCE EXAMPLE 12

Titanium Trichloride Composition (B) prepared as in Catalyst Preparation 1 of Example 10 was treated in the same manner as the Composition in Catalyst Preparation 2 of Example 10, except that di-n-butyl ether was not used. Thus a titanium trichloride catalyst was obtained. Propylene was polymerized according to Polymerization Process 1 of Example 1 using the catalyst thus obtained. Catalytic activity: $R_p = 406$. IY = 96.6. It is apparent from the results obtained in Example 10 and Reference Examples 11 and 12 that the treatment of the present invention is effective.

EXAMPLE 11

Catalyst Preparation 1

Benzyl chloride was added to a solution comprising 100 cc of dry xylene and 30 cc of ethylaluminum dichloride so that the molar ratio of benzyl chloride to ethylaluminum dichloride was 0.25. Thereafter, 32.6 g of the ether-treated solid prepared according to Catalyst Preparation 1 of Example 4 was added thereto. The mixture was stirred at 120° C. for 2 hours.

After the reaction was completed, the reaction system was allowed to stand. The supernatant liquor was removed and the residual solid was washed with two 100 cc portions of toluene and two 100 cc portions of hexane and then dried.

Catalyst Preparation 2

9.5 g of the titanium trichloride composition prepared as in Catalyst Preparation 1 of Example 11 was suspended in 47.5 cc of dry hexane. Thereafter, carbon tetrachloride and diisoamyl ether was added to the suspension so as to achieve the following molar ratio: Composition:$CCl_4$:diisoamyl ether = 1:0.3:1.0. The mixture was treated at 60° C. for 2 hours to obtain a solid titanium trichloride catalyst.

Polymerization of Propylene

Propylene was polymerized according to Polymerization Process 1 of Example 1 using the solid titanium trichloride catalyst thus obtained. Catalytic activity: $R_p = 590$. IY = 97.7. The resulting polymer had a high degree of stereo-regularity and a bulk density of 0.46 g/cm³. $[\eta] = 2.10$.

REFERENCE EXAMPLE 13

Propylene was polymerized according to Polymerization Process 1 of Example 1 using the titanium trichloride composition prepared as in Catalyst Preparation 1 of Example 11. Catalytic activity: $R_p = 332$. IY = 96.8. The resulting polymer had a bulk density of 0.43 g/cm³. $[\eta] = 1.90$.

EXAMPLES 12 TO 17

Solid titanium trichloride catalysts were prepared in the same manner as in Example 11, except that the conditions of Catalyst Preparation 1 of Example 11 were changed in various ways in the preparation of the titanium trichloride composition. Using these solid catalysts, propylene was polymerized according to Polymerization Process 1 of Example 1. The results obtained are shown in Table 2 below.

TABLE 2

| | | | Preparation Conditions of Titanium Trichloride Composition | | | | |
|---|---|---|---|---|---|---|---|
| | | | | | | Catalytic Activity | |
| Example | RX | Solvent | Aluminum Compound | RX/ Aluminum Compound (molar ratio) | Temperature (° C) | Time (hr) | $R_p$ | IY |
| 12 | 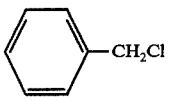 | Xylene | EtAlCl$_2$ | 0.10 | 120 | 2.0 | 580 | 97.5 |
| 13 | " | " | " | " | " | 1.0 | 560 | 97.5 |
| 14 | " | " | " | " | 100 | 2.0 | 562 | 97.0 |
| 15 | " | Toluene | " | " | 90 | 2.0 | 510 | 95.8 |
| 16 | " | Xylene | " | 0.30 | 120 | 2.0 | 592 | 97.6 |
| 17 | n-BuCl | " | " | 0.20 | 70 | 2.0 | 402 | 92.0 |

Et = ethyl
n-Bu = n-butyl

EXAMPLE 18

Catalyst preparation 1

17.0 g of the titanium trichloride composition prepared according to Catalyst Preparation 1 of Example 11 was suspended in 85.0 cc of dry hexane. Thereafter, diisoamyl ether in an equimolar amount to that of the composition was added to the suspension. The mixture was treated at 60° C. for 1 hour. After reaction, the supernatant liquor was removed and the residual solid was washed with three 50 cc portions of hexane, dried and separated into pieces. The catalyst thus obtained was designated Titanium Trichloride Composition (C).

Catalyst Preparation 2

13.8 g of Titanium Trichloride Compodition (C) prepared as in Catalyst Preparation 1 of Example 18 was suspended in 69 cc of dry hexane. Thereafter, carbon tetrachloride and diisoamyl ether were added to the suspension so as to achieve the following molar ratio: composition (C):CCl$_4$:diisoamyl ether = 1:0.1:0.3. The mixture was reacted at 60° C. for 2 hours. After reaction, the supernatant liquor was removed and the residual solid was washed with three 30 cc portions of hexane and dried to obtain a solid titanium trichloride catalyst.

Polymerization of Propylene

Propylene was polymerized according to Polymerization Process 1 of Example 1 using the solid titanium trichloride catalyst thus obtained. $R_p$ = 582. IY = 97.1. [η] = 2.00. The resulting polymer had a bulk density of 0.44 g/cm$^3$.

REFERENCE EXAMPLE 14

Propylene was polymerized according to Polymerization Process 1 of Example 1 using Titanium Trichloride Composition (C) in Catalyst Preparation 1 of Example 18. $R_p$ = 443. IY = 96.5.

EXAMPLE 19

Catalyst Preparation 1

15.0 g of powdery anhydrous aluminum chloride and 40 cc of a xylene, well dried, were charged into a 100 cc flask and the mixture was stirred. Hydrogen chloride gas was bubbled into the mixture to dissolve the aluminum chloride completely. Thereafter, 8.8 g of the ether-treated solid prepared according to Catalyst Preparation 1 of Example 4 was added thereto. Stirring of the mixture was continued at 60° C. for 2 hours.

After reaction, the resulting slurry was centrifuged to separate a titanium trichloride composition. The separated composition was further washed with five 50 cc portions of xylene (at 70° C.) and vacuum-dried.

Catalyst Preparation 2

5.2 g of the titanium trichloride composition produced as in Catalyst Preparation 1 of Example 19 was suspended in 26.0 cc of dry hexane. Thereafter, carbon tetrachloride and diisoamyl ether were added to the suspension so as to achieve the following molar ratio: composition:CCl$_4$:diisoamyl ether = 1:0.5:0.5. The mixture was treated at 60° C. for 2 hours to obtain a solid titanium trichloride catalyst.

Polymerization of Propylene

Propylene was polymerized according to Polymerization Process 1 of Example 1 using the solid titanium trichloride catalyst thus obtained. $R_p$ = 310. IY = 96.2.

REFERENCE EXAMPLE 15

Propylene was polymerized according to Polymerization Process 1 of Example 1 using the titanium trichloride composition prepared as in Catalyst Preparation 1 of Example 19. $R_p$ = 225. IY = 95.9.

EXAMPLE 20

Catalyst Preparation 1

11.5 g of the titanium trichloride composition prepared according to Catalyst Preparation 1 of Example 19 was suspended in 57.5 cc of dry hexane. Thereafter, diisoamyl ether in an equimolar amount to that of the composition was added to the suspension. The mixture was treated at 60° C. for 1 hour. After reaction, the supernatant liquor was removed and the residual solid was washed with three 50 cc portions of hexane, dried and separated into pieces. The catalyst thus obtained was designated Titanium Trichloride Composition (D).

Catalyst Preparation 2

10.0 g of Titanium Trichloride Composition (D) prepared as in Catalyst Preparation 1 of Example 20 was suspended in 50 cc of dry hexane. Thereafter, carbon tetrachloride and diisoamyl ether were added to the suspension so as to achieve the following molar ratio: composition (D):CCl$_4$:diisoamyl ether = 1:0.3:0.3. The mixture was reacted at 60° C. for 2 hours. After reaction, the supernatant liquor was removed and the residual solid was washed with three 30 cc portions of hexane and dried to obtain a solid titanium trichloride catalyst.

Polymerization of Propylene

Propylene was polymerized according to Polymerization Process 1 of Example 1 using the solid titanium trichloride catalyst thus obtained. $R_p = 409$. IY = 96.7.

REFERENCE EXAMPLE 16

Propylene was polymerized according to Polymerization Process 1 of Example 1 using Titanium Trichloride Composition (D) prepared as in Catalyst Preparation 1 of Example 20. $R_p = 307$. IY = 96.2.

EXAMPLE 21

Catalyst Preparation 1

113 g of the ether-treated solid prepared according to Catalyst Preparation 1 of Example 4 was added to a solution comprising 339 cc of dry heptane and 226 cc of titanium tetrachloride. The mixture was treated at 70° C. for 2 hours. After reaction, the supernatant liquor was removed and the residual solid was washed with three 300 cc portions of hexane and dried to obtain a titanium trichloride composition.

Catalyst Preparation 2

10.1 g of the titanium trichloride composition prepared as in Catalyst Preparation 1 of Example 21 was suspended in 50.5 cc of dry hexane. Thereafter, carbon tetrachloride and diisoamyl ether were added to the suspension so as to achieve the following molar ratio: composition:CCl$_4$:diisoamyl ether = 1:0.1:0.3. The mixture was reacted at 60° C. for 2 hours.

After reaction, the supernatant liquor was removed and the residual solid was washed with three 30 cc portions of hexane to obtain a solid titanium trichloride catalyst.

Polymerization of Propylene

Propylene was polymerized according to Polymerization Process 1 of Example 1 using the solid titanium trichloride catalyst thus obtained. $R_p = 637$. IY = 97.5.

REFERENCE EXAMPLE 17

Propylene was polymerized according to Polymerization Process 1 of Example 1 using the titanium trichloride composition prepared as in Catalyst Preparation 1 of Example 21. $R_p = 567$. IY = 97.1

REFERENCE EXAMPLE 18

12.0 g of the titanium trichloride composition prepared as in Catalyst Preparation 1 of Example 21 was slurried in dry hexane. Thereafter, carbon tetrachloride was added to the slurry so that the molar ratio of the composition to carbon tetrachloride was 1:0.1. The mixture was reacted at 60° C. for 2 hours. After reaction, the supernatant liquor was removed and the residual solid was washed with three 30 cc portions of hexane to obtain a titanium trichloride catalyst.

Propylene was polymerized according to Polymerization Process 1 of Example 1 using the catalyst thus obtained. The effect of the treatment was, however, low as shown by the following data: $R_p = 564$. IY = 97.2.

REFERENCE EXAMPLE 19

A titanium trichloride catalyst was prepared in the same manner as in Reference Example 18, except that the carbon tetrachloride treatment was carried out under the conditions wherein the molar ratio of titanium trichloride composition to carbon tetrachloride was 1:5.0, the treating temperature was 30° C. and the treating time was 1 hour. Using the catalyst thus obtained, propylene was polymerized according to Polymerization Process 1 of Example 1. The effect of the treatment was, however, low as shown by the following data: $R_p = 540$. IY = 97.2.

It is apparent from the results in Example 21 and Reference Examples 17, 18 and 19 that the treatment of the present invention is effective.

EXAMPLE 22

Catalyst Preparation 1

12.1 g of the titanium trichloride composition prepared according to Catalyst Preparation 1 of Example 3 was suspended in 60.5 cc of dry hexane. Thereafter, diisoamyl ether in an amount equimolar to that of the composition was added to the suspension. The mixture was stirred at 40° C. for 1 hour. After the reaction was completed, the supernatant liquor was removed and the residual solid was washed with three 100 cc portions of hexane and dried. The product thus obtained was designated Titanium Trichloride Composition (E).

Catalyst Preparation 2

9.7 g of Titanium Trichloride Composition (E) prepared as in Catalyst Preparation 1 of Example 22 was suspended in 48.5 cc of hexane. Thereafter, carbon tetrachloride and diisoamyl ether were added to the suspension so as to satisfy the following molar ratio: composition (E):CCl$_4$:diisoamyl ether = 1:0.3:0.5. The mixture was treated at 60° C. for 2 hours. After reaction, the resulting solid was washed with three 30 cc portions of hexane to obtain a solid titanium trichloride catalyst.

Polymerization of Propylene

Propylene was polymerized according to Polymerization Process 1 of Example 1 using the solid titanium trichloride catalyst thus obtained. $R_p = 285$. IY = 96.0.

While the invention has been described in detail and with reference to specific embodiments thereof, it will be apparent to one skilled in the art that various changes and modifications can be made therein without departing from the spirit and scope thereof.

What is claimed is:

1. In a method for the production of a solid catalyst for olefin polymerization comprising preparing a titanium trichloride composition by reducing tetrachloride with an organo-aluminum compound of the formula:

$$R_n A X_{3-n}$$

wherein R is a straight or branched alkyl group, an alicyclic group or an aromatic hydrocarbon group, each having up to 18 carbon atoms, X is a halogen atom or a hydrogen atom, and $n$ satisfies the relationship $1 \leq n \leq 3$, at a temperature of about $-100°$ to about $60°$ C. to obtain a solid reduction product, and then treating the resulting solid reduction product by one of the following methods, (a), (b), (c), (d), (e) or (f):

(a) heat-treating the solid reduction product at about 100° to about 180° C. in the absence of or presence of an inert solvent, (b) catalytically treating the solid reduction product with an aluminum compound of the formula:

$$R''_p A X_{3-p}$$

wherein R'' is a straight or branched alkyl group, an alicyclic group or an aromatic hydrocarbon group, each having up to 18 carbon atoms, X is a halogen atom, and $p$ satisfies the relationship $1 = p$ 1.5, and, optionally, further catalytically treating the resulting product with an ether, (c) catalytically treating the solid reduction product with an ether and then with an aluminum compound of the formula:

$$R''_p A X_{3-p}$$

wherein R'' is a straight or branched alkyl group, an alicyclic group or an aromatic hydrocarbon group, each having up to 18 carbon atoms, X is a halogen atom, and $p$ satisfies the relationship $1 \leq p < 1.5$, and, optionally, further catalytically treating the resulting product with an ether, (d) catalytically treating the solid reduction product with an ether and then with an aluminum compound of the formula:

$$R''_p A X_{3-p}$$

wherein R'' is a straight or branched alkyl group, an alicyclic group or an aromatic hydrocarbon group, each having up to 18 carbon atoms, X is a halogen atom, and $p$ satisfies the relationship $1 \leq p < 1.5$, in the presence of an organo-halogen compound of the formula:

$$R'''X$$

wherein R''' is a straight or branched alkyl group, an alicyclic group or an aromatic hydrocarbon group, each having up to 18 carbon atoms, and X is a halogen atom, and, optionally, further catalytically treating the resulting product with an ether, (e) catalytically treating the solid reduction product with an ether and then with an aluminum halide of the formula:

$$AlX_3$$

wherein X is a halogen atom, dissolved in an aromatic hydrocarbon in the presence of a hydrogen halide of the formula:

$$HX$$

wherein X is a halogen atom, and, optionally, further catalytically treating the resulting product with an ether, (f) catalytically treating the solid reduction product with an ether and then with titanium tetrachloride; the improvement comprising treating the thus produced titanium trichloride composition at a temperature of from about 0° to about 150° C. with a mixture of a halogenated hydrocarbon (1) represented by the formula $$CH_qX_{4-q}$$

wherein X is a halogen atom and $q$ is an integer satisfying the relationship $0 \leq q < 4$, and an ether (2) represented by the formula $$R_3-O-R_4$$

wherein $R_3$ and $R_4$, which may be the same or different, each is an alkyl group, an alicyclic group or an aromatic hydrocarbon group, each having up to 10 carbon atoms, wherein the amounts of the halogenated hydrocarbon and ether used in the catalytic treating of the titanium trichloride composition are about 0.001 to about 1.0 and about 0.001 to about 5 times on a molar basis to the amount of the titanium trichloride contained in the titanium trichloride composition, respectively.

2. The method according to claim 1, wherein said ether used in method (b), (c), (d), (e) or (f) is represented by the general formula:

$$R_1-O-R_2$$

wherein $R_1$ and $R_2$, which may be the same or different, each is an alkyl group or an aromatic hydrocarbon group, each having up to 10 carbon atoms.

3. The method according to claim 2, wherein said ether used in method (b), (c), (d), (e) or (f) is di-n-butyl ether or diisoamyl ether.

4. The method according to claim 2, wherein the amount of the ether used in the catalytic treatment of method (b), (c), (d), (e) or (f) is about 0.05 to about 3 times on a molar basis the amount of the titanium trichloride contained in the solid reduction product produced to be treated.

5. The method according to claim 4, wherein the amount of the ether used in method (b), (c), (d), (e) or (f) is 0.5 to 1.5 times on a molar basis.

6. The method according to claim 2, the treatment with the ether used in method (b), (c), (d), (e) or (f) is carried out at a temperature of 0° to 100° C.

7. The method according to claim 1, wherein said aluminum compound is represented by the general formula:

$$R''AlX_2$$

wherein R'' and X are as defined above.

8. The method according to claim 1, wherein said aluminum halide is aluminum chloride.

9. The method according to claim 1, wherein R''' in said organo-halogen compound is an alkyl group or an aralkyl group.

10. The method according to claim 1, wherein the amount of the aluminum compound is about 0.1 to about 10 times on a molar basis the amount of the titanium trichloride contained in the solid reduction product to be treated.

11. The method according to claim 10, wherein the amount of the aluminum compound is 0.5 to 5 times on a molar basis.

12. The method according to claim 1, wherein the catalytic treating with the aluminum compound is at a temperature of from about room temperature to about 200° C.

13. The method according to claim 12, wherein the temperature is 50° to 180° C.

14. The method according to claim 1, wherein the concentration of the aluminum halide is about 1 to about 80% by weight based on the total amount of the aluminum halide and the aromatic hydrocarbon.

15. The method according to claim 14, wherein the amount of the aluminum halide is 0.5 to 5 times on a molar basis the amount of the titanium trichloride contained in the ether-treated solid reduction product.

16. The method according to claim 1, wherein the catalytic treating with the aluminum halide is at a temperature of from about −100° to about 200° C.

17. The method according to claim 1, wherein the catalytic treating with the titanium tetrachloride is at a temperature of from about room temperature to about 100° C.

18. The method according to claim 1, wherein said halogenated hydrocarbon is carbon tetrachloride, chloroform, methylene chloride, carbon tetrabromide, bromoform, methylene bromide or a combination thereof.

19. The method according to claim 18, wherein said halogenated hydrocarbon is carbon tetrachloride.

20. The method according to claim 1, wherein the ether (2) is di-n-butyl ether or diisoamyl ether.

21. The method according to claim 1, wherein the amounts of halogenated hydrocarbon (1) and the ether (2) are 0.003 to 1.0 and 0.003 to 1.5 times on a molar basis, respectively.

22. A catalyst for olefin polymerization produced according to the method of claim 1.

* * * * *

UNITED STATES PATENT AND TRADEMARK OFFICE
CERTIFICATE OF CORRECTION

PATENT NO. : 4,123,387
DATED : October 31, 1978
INVENTOR(S) : Akinobu Shiga et al It is certified that error appears in the above-identified patent and that said Letters Patent are hereby corrected as shown below:

IN THE CLAIMS:

Column 20, line 64, before "tetrachloride" insert --titanium--

Signed and Sealed this

Eleventh Day of December 1979

[SEAL]

Attest:

SIDNEY A. DIAMOND

Attesting Officer

Commissioner of Patents and Trademarks